(12) United States Patent
Shimao et al.

(10) Patent No.: US 8,962,163 B2
(45) Date of Patent: Feb. 24, 2015

(54) ALUMINUM ALLOY FOR ANODIZATION AND ALUMINUM ALLOY COMPONENT

(75) Inventors: Ryousuke Shimao, Kitakata (JP); Shigekazu Nagai, Kitakata (JP)

(73) Assignee: Showa Denko K.K., Tokyo (JP)

( * ) Notice: Subject to any disclaimer, the term of this patent is extended or adjusted under 35 U.S.C. 154(b) by 249 days.

(21) Appl. No.: 13/518,061

(22) PCT Filed: Dec. 17, 2010

(86) PCT No.: PCT/JP2010/072760
§ 371 (c)(1),
(2), (4) Date: Aug. 16, 2012

(87) PCT Pub. No.: WO2011/078080
PCT Pub. Date: Jun. 30, 2011

(65) Prior Publication Data
US 2012/0298513 A1    Nov. 29, 2012

(30) Foreign Application Priority Data
Dec. 22, 2009 (JP) ................................ 2009-290876

(51) Int. Cl.
*B32B 15/04* (2006.01)
*C22C 21/06* (2006.01)
*C25D 11/16* (2006.01)
(Continued)

(52) U.S. Cl.
CPC . *C22F 1/05* (2013.01); *C25D 11/04* (2013.01); *F16D 2125/06* (2013.01); *F16D 2200/003* (2013.01)
USPC .............. 428/702; 428/701; 205/50; 420/532

(58) Field of Classification Search
None
See application file for complete search history.

(56) References Cited

U.S. PATENT DOCUMENTS

| 4,540,449 A * | 9/1985 | Yoshida et al. ............ 428/472.2 |
| 2003/0024777 A1 | 2/2003 | Kurimoto et al. |

(Continued)

FOREIGN PATENT DOCUMENTS

| EP | 2 034 035 A1 | 3/2009 |
| JP | 10-204566 A | 8/1998 |

(Continued)

OTHER PUBLICATIONS

Official Communication issued in International Patent Application No. PCT/JP2010/072760, mailed on Mar. 15, 2011.

*Primary Examiner* — Vera Katz
(74) *Attorney, Agent, or Firm* — Keating & Bennett, LLP

(57) ABSTRACT

The present invention provides an aluminum alloy component having an anodic oxide film less causing cracks and high in surface smoothness, which is capable of reducing abrasion of a cutting tool regardless of the excellent machinability. The aluminum alloy component (1) has an anodic oxide film formed on a surface of a base metal of an aluminum alloy. The aluminum alloy consists of Fe: 0.5 to 2 mass %, Cu: 0.35 to 0.6 mass %, Mg: 0.35 to 1.3 mass %, Si: 0.2 to 1.3 mass %, Cr: 0.005 to 0.3 mass %, Mn: 0.01 to 0.3 mass %, Ti: 0.005 to 0.1 mass %, and the balance being inevitable impurities, wherein Zn is controlled to be less than 0.25 mass %, and wherein Al—Fe series crystals and Al—Fe—Si series crystals having a maximum grain diameter of 30 μm or less exist in the anodic oxide film in a dispersed manner with an average center-to-center distance of 10 to 100 μm, and a percentage of a total occupied area of the Al—Fe series crystals and Al—Fe—Si series crystals in the anodic oxide film is 5% or more.

2 Claims, 4 Drawing Sheets

(51) Int. Cl.
  *C22C 21/02* (2006.01)
  *C22F 1/05* (2006.01)
  *C25D 11/04* (2006.01)
  *F16D 125/06* (2012.01)

(56) References Cited

U.S. PATENT DOCUMENTS

2003/0143102 A1* 7/2003 Matsuoka et al. ............ 420/546
2007/0209739 A1* 9/2007 Zhao ............................ 148/551

FOREIGN PATENT DOCUMENTS

| | | | |
|---|---|---|---|
| JP | 2001-59124 A | | 3/2001 |
| JP | 2002-70902 A | | 3/2002 |
| JP | 2002-293055 A | | 10/2002 |
| JP | 2003-42201 A | | 2/2003 |
| JP | 2003-277989 A | | 10/2003 |
| JP | 2003-282164 A | | 10/2003 |
| JP | 2004-232087 A | | 8/2004 |
| JP | 2005035034 | * | 2/2005 |
| JP | 2005-248213 A | | 9/2005 |
| JP | 2007-308766 A | | 11/2007 |
| JP | 2008266719 MT | * | 6/2008 |
| JP | 2008-266719 A | | 11/2008 |

* cited by examiner

ALUMINUM ALLOY FOR ANODIZATION AND ALUMINUM ALLOY COMPONENT

TECHNICAL FIELD

The present invention relates to an aluminum alloy suitable for anodization, and also relates to an aluminum alloy component having an anodic oxide film.

BACKGROUND TECHNIQUE

In recent years, in a disk brake for a vehicle, such as, e.g., a four-wheel vehicle or a two-wheel vehicle, a brake piston of aluminum alloy is employed to attain high-performance and low-fuel consumption. The cup-shaped brake piston 1 shown in FIG. 1 is one example thereof (see Patent Document No. 1).

FIG. 2A shows a disk brake 10 in a brake-off state, and FIG. 2B shows a disk brake in a brake-on state. In the disk brake 10, when a liquid pressure is applied to an inside of a cylinder of a caliper 11 in which the brake piston 1 is accommodated, the open end portion of the brake piston 1 presses a back plate 13 of a friction pad 12, causing a contact of the friction pad 12 with the brake disk 14, which in turn results in a braking action.

The aforementioned cup-shaped brake piston can be produced by, for example, extruding a billet, drawing the extruded member into a bar-shaped member, subjecting the bar-shaped drawn member to solution treatment, subjecting the solution treated member to aging treatment to attain desired mechanical strength, and then machining the aged member into a cup-shape. Alternatively, it can be produced by, for example, casting a bar-shaped member of aluminum alloy, cutting the cast member into a predetermined thickness, forging the cut member into a cup-shape, subjecting the cup-shaped forged member to T6 treatment, and then machining the T6 treated forged member to improve the dimensional accuracy and remove distortion caused during the solution treatment (see Patent Document No. 2).

The brake piston is a sliding member. Therefore, the brake piston is required to have material strength and wear resistance capable of preventing deformation during the brake operation, and also is required to have machinability during the production and smoothness of the sliding surface to attain smooth braking when in use.

For the material of such a brake piston, high-strength and high-wear and abrasion resistance aluminum alloy in which elements, such as, e.g., Cu, Mn, and/or Cr, are added to an Al—Si series alloy or an Al—Mg—Si series alloy is used. In order to improve the wear resistance and the corrosion resistance, an anodic oxide film is formed on the alloy (see Patent Documents Nos. 2-4). As an aluminum alloy suitable for anodization, an Al—Fe series alloy used as an architectural material or a cap material for a beverage bottle is known (Patent Documents Nos. 5-7).

Patent Documents 2 and 3 describe that strength of an anodic oxide film is influenced by the existence state of Si particles.

PRIOR ART DOCUMENTS

Patent Documents

[Patent Document 1] Japanese Unexamined Laid-open Patent Application Publication No. 2002-70902 (JP-2002-70902, A).

[Patent Document 2] Japanese Unexamined Laid-open Patent Application Publication No. 2004-232087 (JP-2004-232087, A).

[Patent Document 3] Japanese Unexamined Laid-open Patent Application Publication No. H10-204566 (JP- H10-204566, A).

[Patent Document 4] Japanese Unexamined Laid-open Patent Application Publication No. 2001-59124 (JP-2001-59124, A).

[Patent Document 5] Japanese Unexamined Laid-open Patent Application Publication No. 2003-277989 (JP-2003-277989, A).

[Patent Document 6] Japanese Unexamined Laid-open Patent Application Publication No. 2003-282164 (JP-2003-282164, A).

[Patent Document 7] Japanese Unexamined Laid-open Patent Application Publication No. 2005-248213 (JP-2005-248213, A).

SUMMARY OF THE INVENTION

Problems to be Solved by the Invention

As explained above, as an aluminum alloy for a brake piston or an aluminum alloy for anodization, it can be considered to use Al—Si series alloys, Al—Mg—Si series alloys, or Al—Fe series alloys. However, these alloys have advantages and disadvantages.

Al—Si series alloys are high in material strength as aging alloy and excellent in detachability of chips during a cutting work due to functions of eutectic Si particles contained in the base metal. However, eutectic Si particles in the base metal cause severe abrasion of a cutting tool. A larger additive amount of Si in the base metal has a beneficial effect on crack prevention of an anodic oxide film, but causes deterioration of surface smoothness of a film since eutectic Si particles prevent even growth of a film.

Al—Mg—Si series alloys are high in material strength as aging alloy and causes less abrasion of a cutting tool as compared with Al—Si series alloys since no eutectic Sir particles exist in the base metal, but the alloys are poor in detachability of chips. Al—Mg—Si series alloys are better in surface smoothness of an anodic oxide film as compared with Al—Si series alloys, but may causes deep cracks which reaches from the film surface to the base metal since no eutectic Si particle exists in the film.

Al—Fe series alloys are aluminum alloy for anodization but not aging alloy, and therefore they are lower in strength than Al—Si series alloys or Al—Mg—Si series alloys, which cannot meet strength required for a brake piston.

Means for Solving the Problems

The present invention was made in view of the aforementioned technical background, and aims to provide an aluminum alloy capable of creating an anodic oxide film high in surface smoothness, which is improved in strength as compared with conventional Al—Fe series alloys, reduced in abrasion of a cutting tool while keeping its excellent cutting performance, and causes less crack generation. The present invention also aims to provide an aluminum alloy component having an anodic oxide film.

The present invention has a structure as recited in the following [1] to [4].

[1] An aluminum alloy for anodization, consisting of Fe: 0.5 to 2 mass %, Cu: 0.35 to 0.6 mass %, Mg: 0.35 to 1.3 mass %, Si: 0.2 to 1.3 mass %, Cr: 0.05 to 0.3 mass %, Mn: 0.05 to 0.3 mass %, Ti: 0.005 to 0.1 mass %, and the balance being Al and inevitable impurities, wherein Zn is controlled to be less than 0.25 mass %.

[2] An aluminum alloy component in which an anodic oxide film is formed on a surface of a base metal of an aluminum alloy, wherein the aluminum alloy consists of Fe: 0.5 to 2 mass %, Cu: 0.35 to 0.6 mass %, Mg: 0.35 to 1.3 mass %, Si: 0.2 to 1.3 mass %, Cr: 0.05 to 0.3 mass %, Mn: 0.01 to 0.3 mass %, Ti: 0.005 to 0.1 mass %, and the balance being Al and inevitable impurities, wherein Zn is limited to be less than 0.25 mass %, and wherein Al—Fe series crystals and Al—Fe—Si series crystals having a maximum grain diameter of 30 μm or less exist in the anodic oxide film in a dispersed manner with an average center-to-center distance of 10 to 100 μm, and a percentage of a total occupied area of the Al—Fe series crystals and Al—Fe—Si series crystals in the anodic oxide film is 5% or more.

[3] The aluminum alloy component as recited in the aforementioned Item [2], wherein the aluminum alloy component is a brake piston.

[4] A production method of an aluminum alloy component, comprising:

age hardening a base metal constituted by an aluminum alloy consisting of Fe: 0.5 to 2 mass %, Cu: 0.35 to 0.6 mass %, Mg: 0.35 to 1.3 mass %, Si: 0.2 to 1.3 mass %, Cr: 0.05 to 0.3 mass %, Mn: 0.05 to 0.3 mass %, Ti: 0.005 to 0.1 mass %, and the balance being Al and inevitable impurities, wherein Zn is controlled to be less than 0.25 mass %; and thereafter anodizing the base metal to form an anodic film.

Effects of the Invention

According to the aluminum alloy as recited in the aforementioned Item [1], although it is an Al—Fe series alloy, it becomes possible to attain age hardening by the added Cu, Mg, and Si. High strength can be attained by heat treatment. Further, the Al—Fe series crystals and Al—Fe—Si series crystals crystallized during casting solidification have hardness which enhances detachability of chips. However, the hardness is lower than that of Si particles crystallized in Al—Si series alloys, and therefore cutting tool abrasion can be reduced than Al—Si series alloys. By anodizing, Al—Fe series crystals and Al—Fe—Si series crystals remain in the film without being dissolved, causing an existence of these crystals in a dispersed manner. This enables creation of an anodic oxide film which causes less cracks due to the dispersed crystals.

In the aluminum alloy component as recited in the aforementioned Item [2], the base metal is constituted by the aluminum alloy as recited in the aforementioned Item [1]. Therefore, high strength exerted by age hardening due to the chemical composition of the base metal alloy, and excellent machinability and tool abrasion reduction effect due to Al—Fe series crystals and Al—Fe—Si series crystals can be obtained. Furthermore, in the anodic oxide film, minute Al—Fe series crystals and Al—Fe—Si series crystals having a maximum grain diameter of 30 μm or less exist in an evenly dispersed manner with an average center-to-center distance of 10 to 100 μm, and a percentage of occupied area of these crystals in the anodic oxide film is 5% or more. Therefore, these crystals absorb stress caused by the difference of linear coefficient of expansion between the base metal and the film during the anodization, resulting in less crack generation. Further, crystals are minute and exist evenly, which causes even growth of the film. As a result, a film high in surface smoothness can be formed.

According to the aluminum alloy component as recited in the aforementioned Item [3], the aforementioned effects can be attained in a brake piston.

According to the production method of the aluminum alloy component as recited in the aforementioned Item [4], high strength can be exerted due to age hardening of the base material. By performing anodization after the age hardening, an aluminum alloy component as recited in the aforementioned Items [2] and [3] can be produced.

EMBODIMENTS FOR CARRYING OUT THE INVENTION

Figure 1:
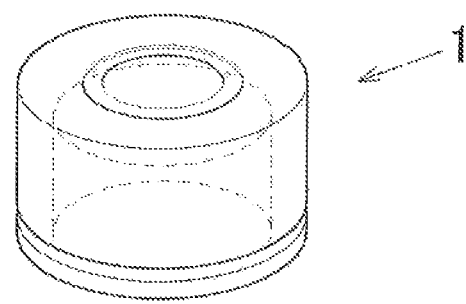
FIG. 1 is a perspective view of a brake piston.

The aluminum alloy of the present invention is an aluminum alloy for anodization capable of creating an anodic oxide film excellent in property, which is enhanced in properties of a base metal by defining its chemical component and dispersing minute Al—Fe series crystals and Al—Fe—Si series crystals derived from the base metal during anodization in a film.

[Chemical Composition of Aluminum Alloy]

Hereinafter, reasons for adding elements to an aluminum alloy and appropriate concentration of the elements will be detailed.

Fe is an element which creates Al—Fe series crystals and Al—Fe—Si series crystals during the casting solidification. As a result of a keen examination of crack generation of a film, the inventor found the fact that the growth of cracks in a film was suppressed by the existence of Al—Fe series crystals and/or Al—Fe—Si series crystals. Based on the findings, by creating Al—Fe series crystals and/or Al—Fe—Si series crystals so as to suppress crack growth as taught by the present invention, an anodic oxide film causing less cracks can be obtained.

In detail, the aforementioned Al—Fe series crystals and Al—Fe—Si series crystals remain unsolved in an anodic oxide film at the time of anodization, reducing crack generation of the film. The Fe concentration in the alloy is set to 0.5 to 2 mass %. If it is less than 0.5 mass %, the amount of created crystals becomes insufficient to reduce crack generation. If it exceeds 2 mass %, coarse crystals (example, the maximum grain diameter of 100 μm) will be generated at the time of casting the base metal, which exerts an adverse influence on mechanical property (elongation) of the base metal. Furthermore, since crystals created during the casting remain in the anodic oxide film, if the crystals are coarse, the surface smoothness of the film deteriorates. The preferable Fe concentration is 0.7 to 1.7 mass %.

Cu is an element which contributes to enhancement of strength of the base metal, and the Cu concentration in the alloy is set to 0.35 to 0.6 mass %. For example, it is preferable that a brake piston has strength of 300 N/mm$^2$ or more, which can be attained by adding Cu. If the Cu concentration is less than 0.35%, less contribution to enhancement of strength can be attained. If it exceeds 0.6 mass %, Cu creates Al—Cu—Fe series crystals together with Fe, which decreases the creation amount of Al—Fe series crystals and Al—Fe—Si series crystals effective to decrease crack generation. On the other hand, the Al—Cu—Fe series crystals are dissolved at the time of anodization, which does not contribute to reduction of crack generation. As a result, an excessive amount of Cu reduces an amount of crystals which contributes to reduction of crack generation of the film. The preferable Cu concentration is 0.4 to 0.5 mass %.

Mg is an element to be added to enhance the strength of the base metal by being precipitated as $Mg_2Si$ in the matrix. The Mg concentration in the alloy is set to 0.35 to 1.3 mass %. If Mg concentration is less than 0.35%, less strength enhancement effect can be obtained. If it exceeds 1.3 mass %, crystals will be formed together with Si, reducing the amount of $Mg_2Si$ to be precipitated, which deteriorates contribution to strength enhancement. The preferable Mg concentration is 0.4 to 1.2 mass %.

Si is an element to be added to precipitate $Mg_2Si$ in the matrix to thereby enhance the strength of the base metal, and the Si concentration in the alloy is set to 0.2 to 1.3 mass %. If the Si concentration is less than 0.2 mass %, less strength enhancement effect can be attained. If it exceeds 1.3 mass %, Si creates crystals together with Mg, resulting in less amount of $Mg_2Si$ to be precipitated, which deteriorates contribution to strength enhancement. The preferable Si concentration is 0.4 to 1.2 mass %.

Cr is an element to be added to miniaturize recrystallized particles after the hot processing or during the solution heat treatment of the base metal to thereby enhance the strength of the base metal. The Cr concentration in the alloy is set to 0.05 to 0.3 mass %. If the Cr concentration is less than 0.05 mass %, less miniaturization effect of recrystallized particles can be attained, resulting in less contribution to enhancement of the strength. Even if it exceeds 0.3 mass %, the effect will be saturated. Further, the excess amount of Cr increases the precipitation density of a chemical compound with Al in the matrix, resulting in deteriorated quenching property. The preferable Cr concentration is 0.1 to 0.2 mass %.

Mn is an element, in the same manner as Cr, to be added to miniaturize recrystallized particles after the hot processing or during the solution heat treatment of the base metal to thereby enhance the strength of the base metal. The Mn concentration in the alloy is set to 0.01 to 0.3 mass %. If the Mn concentration is less than 0.01 mass %, less miniaturization effect of recrystallized particles can be attained, resulting in less contribution to enhancement of the strength. Even if it exceeds 0.3 mass %, the effect will be saturated. Further, the excess amount of Mn increases the precipitation density of a chemical compound with Al in the matrix, resulting in deteriorated quenching property. Mn creates crystals with Fe, Si and/or Cu, which reduces the creation amount of Al—Fe series crystals and Al—Fe—Si series crystals effective to reduce crack generation. On the other hand, the crystals with Fe, Si, and/or Cu are dissolved at the time of the anodization treatment, which does not contribute to reduction of crack generation. As a result, the excessive amount of Mn decreases the amount of crystals which contribute to reduction of crack generation of the film. The preferable Mn concentration is 0.01 to 0.1 mass %.

Ti is an element to be added to miniaturize crystal grains during the casting solidification of the base metal. The Ti concentration in the alloy is set to 0.005 to 0.1 mass %. If Ti concentration is less than 0.005 mass %, less miniaturization effect can be attained. Even if it is added to exceed 0.1 mass %, the effect will be saturated. The preferable Ti concentration is 0.01 to 0.05 mass %.

Zn is an element contained as impurities in a material ingot, but if the Zn concentration in the alloy exceeds a certain value, the characteristics of the anodic oxide film deteriorate, which in turn may cause deterioration of corrosion resistance of the base metal. For this reason, the Zn concentration is controlled to be less than 0.25 mass %. In the aluminum alloy containing Mg and Si, the potential of Zn becomes base, causing dissolution of Zn during the anodization, which results in a more porous film. For this reason, when the Zn concentration is 0.25 mass % or more, the anodized member may cause acid corrosion or the like. The preferable Zn concentration is less than 0.1 mass %. If it is tried to reduce the Zn concentration as much as possible, the cost for purifying the material ingot increases. Therefore, in the present invention, the Zn concentration is set to less than 0.25 mass % considering the cost performance.

[Aluminum Alloy Component]

An aluminum alloy component according to the present invention is a component in which an anodic oxide film is formed on a surface of a base metal of the aluminum alloy having the aforementioned chemical composition.

Although the aluminum alloy constituting the base metal is Al—Fe series alloy, the alloy can be age-hardened by adding Mg and Si, and the strength of the base metal can be enhanced by heat treatment. In a conventionally known Al—Fe series alloy, in which no such elements are added, no age-hardening is exerted, which is not appropriate for the use as a sliding component due to lack of strength. According to the alloy of the present invention, although the alloy is Al—Fe series alloy, the alloy can be age-hardened and satisfies the strength required for a sliding member.

Further, the Al—Fe series crystals and the Al—Fe—Si series crystals crystalized in the base metal are particles sufficient enough to become starting points for detaching the chips. Therefore, the detachability of chips is excellent, which is sufficient enough to improve the machinability as compared with 6000 series alloys. However, the Al—Fe series crystals and the Al—Fe—Si series crystals are lower in hardness than Si particles crystallized in Al—Si series alloys, which causes less abrasion of a cutting tool than Al—Si series alloys. In other words, a degree of machinability of the alloy and a degree of abrasion of a cutting tool are in between 6000 series alloys and Al—Si series alloys, which are both preferably balanced.

The anodic oxide film includes minute Al—Fe series crystals and Al—Fe—Si series crystals in a dispersed manner. The Al—Fe series crystals and the Al—Fe—Si series crystals are minute particles/grains having a maximum diameter of 30 μm or less and dispersed evenly with an average center-to-center distance of 10 to 100 μm. The center-to-center distance of crystals is defined by the distance L1, L2, ..., and Ln between the center of one of crystal particles/grains 21 dispersed in the anodic oxide film 20 and the center of another crystal particles/grains 21 existing around the one of crystal particles/grains 21, and the average center-to-center distance is defined by an average value thereof. The amount of crystals in the film is 5% or more in the percentage of the total occupied area of the Al—Fe series crystals and the Al—Fe—Si series crystals in the anodic oxide film. It is preferable that the occupied area of the eutectic Si particles to be crystallized is almost nothing and the percentage of the occupied area is 1% or less.

The percentage of the occupied area (the ratio of the occupied area) is a percentage occupied by crystals when a cross-sectional view taken in a thickness direction of the film is observed and represented by the following formula. The observation view can be magnified 100 to 400 times with an optical microscope.

Percentage of occupied area (%)=(area of crystals/area of the observed view)×100

The Al—Fe series crystals and the Al—Fe—Si series crystals are elements derived from the base metal and remained in the film without being dissolved during the anodization. It is assumed that these crystals absorb stress caused by the difference of linear coefficient of expansion between the base metal and the film during the anodization to thereby reduce crack generation. Such effect can be obtained when minute crystal grains having the maximum grain diameter of 30 μm or less are dispersed evenly with the average center-to-center distance of 10 to 100 μm and the percentage of occupied area in the film is 5% or more. The crystal grains are minute and dispersed evenly, causing even growth of the film, which results in creation of a film having high-surface smoothness. In reducing crack generation and obtaining a film high in surface smoothness, the preferable maximum grain diameter of the Al—Fe series crystals and the Al—Fe—Si series crystals is 25 μm or less, more preferably 3 to 15 μm. The preferable center-to-center distance of the Al—Fe series crystals and the Al—Fe—Si series crystals is 20 to 50 μm, and the preferable percentage of occupied area is 5 to 25%.

The thickness of the anodic oxide film is not specifically limited, but it is recommended that a thickness meeting abrasion resistance required for a sliding component such as a brake piston is 30 to 50 μm. Furthermore, the surface smoothness of the anodic oxide film is not specifically limited, but the preferable surface roughness R(z) of a sliding component is 1.5 μm or less, more preferably 0.2 to 1.3 μm.

[Production Method of Aluminum Alloy Component]

An aluminum alloy component of the present invention is produced by forming a base metal for anodization having a predetermined shape and strength using the aluminum alloy having the aforementioned composition and forming an anodic oxide film on a surface of the base metal by performing anodization.

Figure 2A:
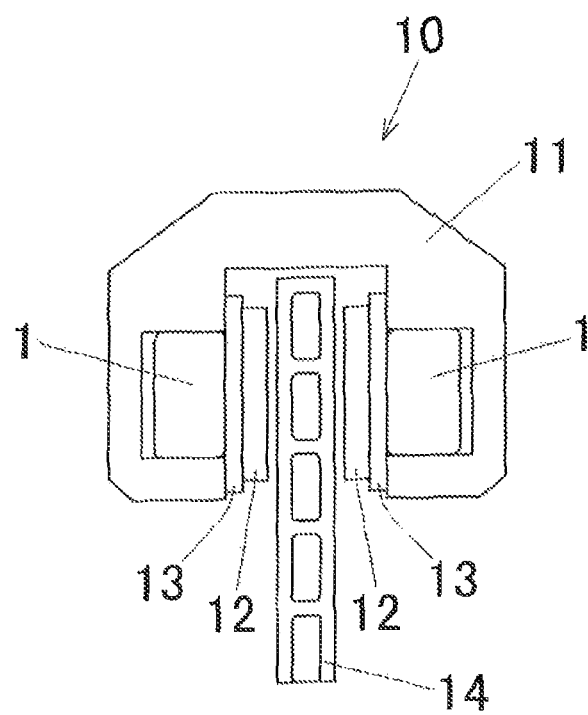
FIG. 2A is a view showing a disk brake in a brake-off state.
Figure 2B:
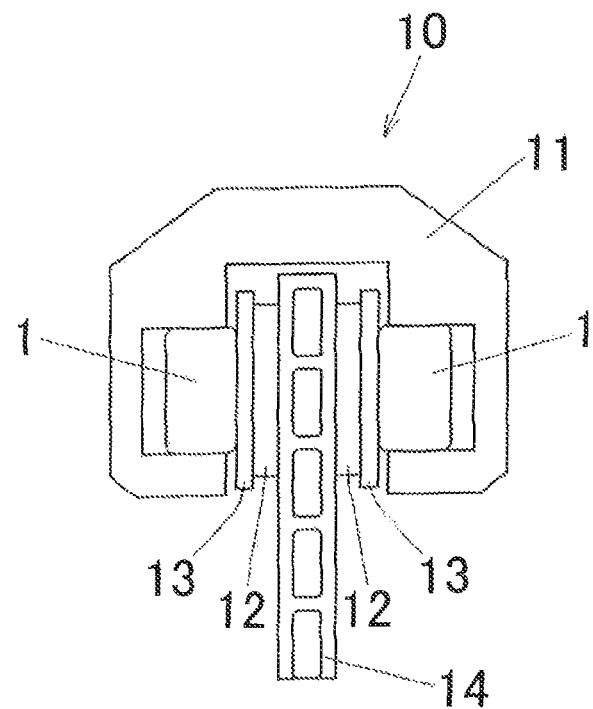
FIG. 2B is a view showing the disk brake in a brake-on state.
Figure 3:
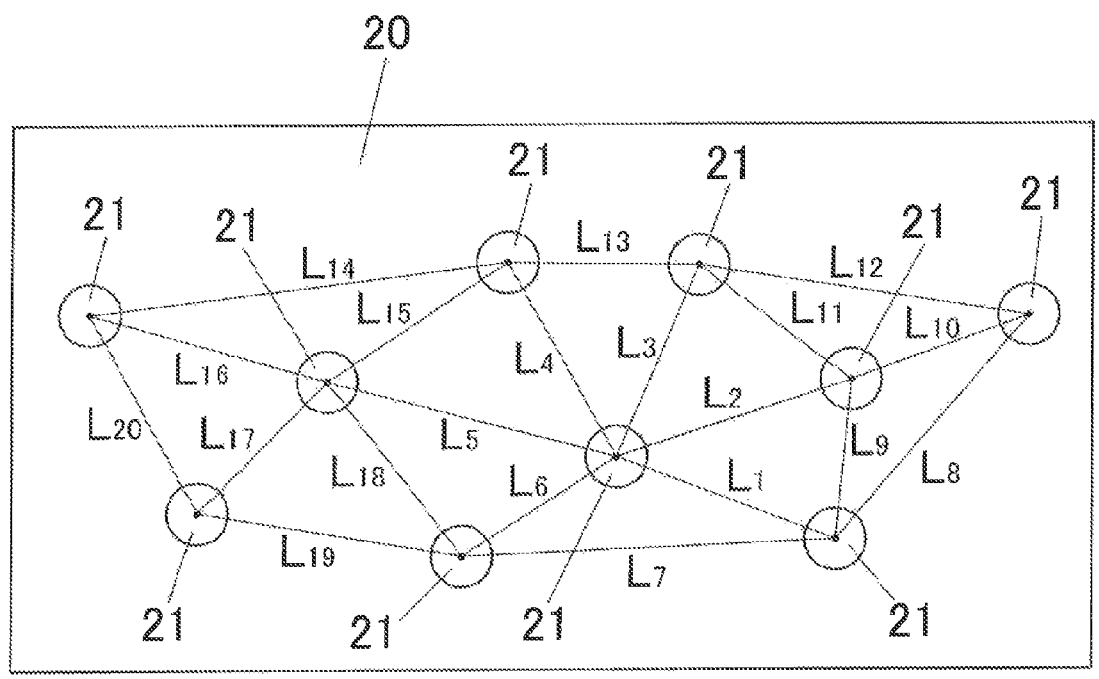
FIG. 3 is a view explaining center-to-center distances of crystals.
Figure 4:
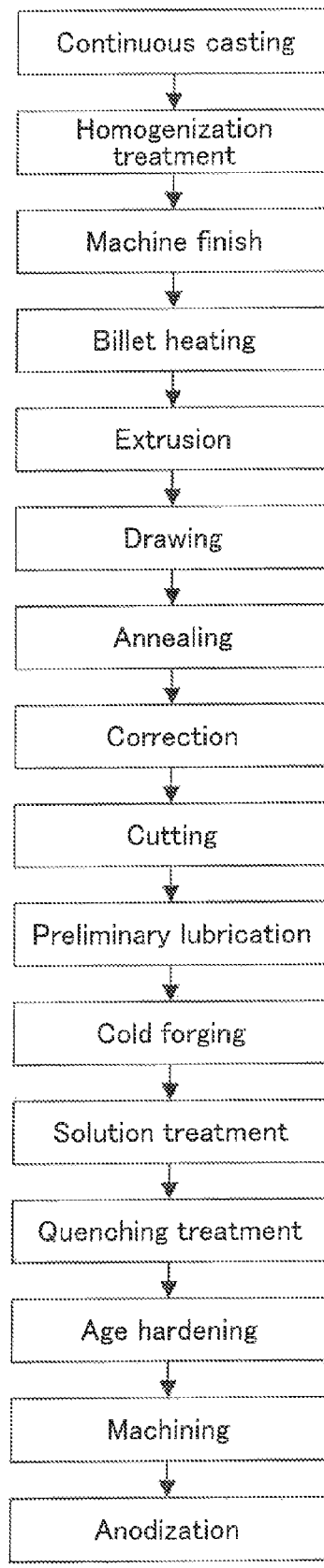
FIG. 4 is a flowchart showing one example of production steps of an aluminum alloy component.

For example, a cup-shaped brake piston 1 to be mounted on a disk brake 10 as shown in FIGS. 1, 2A and 2B is produced through a series of steps shown in FIG. 4.

Initially, an ingot material is dissolved and continuously cast into a bar-shape, and then cut into a predetermined length to obtain a billet. The billet is subjected to soaking treatment and machine finish. Thereafter, it is heated, extruded and then drawn. The drawn member is corrected and then sliced to thereby obtain a forging material. This forging material has a volume corresponding to the weight of a forged product. The forging material is subjected to preliminary lubrication as a pretreatment. The preliminary lubrication is a pretreatment for preventing seizure to a mold during the forging to attain a smooth surface of the forged product, and can be chemical film forming treatment, such as, e.g., bonderizing treatment. The pretreated material is subjected to cold forging to form a cup-shape. The cold forged member is subjected to solution treatment and then age hardening to exert strength. Required portions are cut by mechanical processing to improve the surface smoothness and the size accuracy. Through the aforementioned steps, a base metal for anodization having a predetermined shape and strength is produced. The base metal is subjected to anodization to create an anodic oxide film to thereby obtain an aluminum alloy component.

In the aluminum alloy component of the present invention, since the base metal is an aging alloy, the strength of the base metal can be enhanced by solution treatment after cold forging and the subsequent age hardening. By performing anodic oxide film forming processing after the age hardening, a film of the base metal high in strength can be obtained, which is preferable in terms of the strength when used as a component such as a brake piston. In order to attain the age hardening, for example, solution treatment, quenching treatment, and/or artificial aging treatment are performed. In order to obtain strength required for a brake piston, it is preferable to hold the cold forged component at 500 to 580° C. for 1 hour or more, more preferably 1.5 to 5 hours as solution treatment for a cold forged component and thereafter to quench the solution treated component by submerging into water or forcibly cooling with air as quenching treatment. In the subsequent artificial aging, it is preferable to hold it at 170 to 230° C. for 1 hour or more, more preferably 1.5 to 10 hours.

Since the Al—Fe series crystals and Al—Fe—Si series crystals in the anodic oxide film are derived from the component of the base metal and crystals thereof, in order to minutely and evenly disperse such particles in a film, it is necessary that the Al—Fe series crystals and Al—Fe—Si series crystals are minutely and evenly dispersed in the base metal. The production conditions of the base metal which exert influence on the existence state of crystals in the anodic oxide film are a cooling rate at the continuous casting and the extrusion ratio at the extrusion. The preferable conditions for obtaining the maximum grain diameter of 30 μm or less of crystals in the anodic oxide film and the average center-to-center distance of 10 to 100 μm of crystals and the percentage of crystal occupied area of 5% or more are a cooling rate of 3 to 15° C./sec. and an extrusion ratio of 10 to 70 at the continuous casting. The extrusion ratio is defined by a ratio of (a container cross-sectional area of an extruding apparatus)/(product cross-sectional area). In the case of performing a drawing step, it is preferable that the cross-sectional area decrease ratio represented by the following formula is 2 to 15%.

Cross-sectional area decrease ratio (%)=[(A−B)/A]×100 where A is a cross-sectional area before drawing, and B is a cross-sectional area after drawing.

Conditions for other steps exert less influence on the existence state of crystals in the anodic oxide film and therefore are set appropriately. Since it is sufficient that the base metal to be subjected to anodization has predetermined strength and that crystals are minutely and evenly dispersed, the production steps of the base metal are not limited to the flow shown in FIG. 4. For example, the drawing step can be omitted, or the correction step can be omitted. Furthermore, the steps from the extrusion to the machining process can be replaced by the steps of "extrusion"→"cutting"→"solution treatment"→"quenching"→"forming by machining process."

Furthermore, conditions of the anodization are not specifically limited, and the anodization can be performed by well-known steps under well-known conditions depending on the intended end-usage of the component. Since the brake piston 1 is a sliding component, a hard anodic oxide film is formed. For example, degreasing, etching, water washing, neutralization, anodization, water washing, and sealing treatment are performed sequentially.

EXAMPLES

Using each of the aluminum alloys having the chemical composition shown in Table 1 as a base metal, cup-shaped brake pistons each having an anodic oxide film on a surface of the base metal were produced in accordance with the steps shown in FIG. 4. The alloys in Comparative Examples 1 and 2 were Al—Si series alloys. The alloys in Comparative Example 4 was a 6082 Al alloy. The alloys in Examples 5 and 6 were Al—Fe series alloys.

Conditions in each step were as follows, which were common among Examples 1 to 4 and Comparative Examples 1 to 6. The steps not described below were performed under well-known conditions. The steps were common in Examples 1 to 4 and Comparative Examples 1 to 6.

[Continuous Casting]

A bar having a diameter of 210 mm was continuously casted at the casting temperature of 710° C. +/−10° C., the casting rate of 120 mm/min, and the cooling rate of 7° C/sec. in accordance with a hot-top continuous casting method.

[Homogenization Treatment]

The bar was held at 540° C. for 7 hours.

[Machine Finish]

The bar was machine finished from a diameter of 210 mm to a diameter of 203 mm, and cut into a length of 800 mm to obtain a billet.

[Billet Heating]

The billet was pre-heated to 350° C.

[Extrusion]

The billet was extruded into a round bar having a diameter of 44 mm at an extrusion speed (product speed) of 7.3 mm/min. The extrusion ratio in this extrusion was 22.7.

[Drawing]

The extruded member having a diameter of 44 mm was drawn into a diameter of 43.2 mm. The area decreasing rate in this drawing was 3.6%.

[Annealing]

The drawn member was annealed at 370° C. for 4 hours.

[Preliminary Lubrication]

The annealed member was preliminary lubricated by bonderization treatment.

[Cold Forging]

The preliminary lubricated member was formed into a cup-shape by one pressing of closed die forging.

[Solution Treatment and Quenching Treatment]

The cup-shaped member was held at 540° C. for 3 hours, and then quenched by water cooling.

[Age Hardening]

The solution treated and quenched member was held at 180° C. for 7 hours.

[Machining]

The age hardened member was machined.

[Anodization]

The base metal was subjected to anodization. In this treatment, degreasing by immersion in an acid bath, water washing, neutralization by immersion in an alkaline bath, water washing, anodization by immersion in a 15 wt % sulfuric bath, water washing, and sealing by immersion in a hot water were performed sequentially. By this anodization, an anodic oxide film having a thickness of 37 μm was created.

With respect to the anodized members of Examples 1 and 2, the maximum diameter of the Al—Fe series crystals and the Al—Fe—Si series crystals existed in the film, the average center-to-center distance of the crystals, the percentage of occupied area of crystals, and the occupied area ratio of the eutectic Si particles were investigated as follows. A film cross-sectional sample was created from the anodized member and the microstructure of the cross-section was observed with an optical microscope (400 times). In the observed image, the crystals and eutectic Si particles were approximated into a true circle having the same position of the center of gravity and the same area. Based on the approximation, the maximum grain diameter, the average center-to-center distance of the crystals, the percentage of occupied area of crystals, and the percentage of occupied area of the eutectic Si particles were calculated.

Furthermore, in Examples 1 to 4 and Comparative Examples 1 to 6, the strength of the base metal, the machinability, the tool abrasion, the crack generation and surface smoothness of the anodic oxide film were investigated and evaluated by the following standards. These results are also shown in Table 1.

[Strength of Base Metal]

The tensile strength of the base metal was denoted as follows:

⊚: when the tensile strength was 350 N/mm$^2$ or more;

○: when the tensile strength was 300 N/mm$^2$ or more but less than 350 N/mm$^2$; and ×: when the tensile strength was less than 300 N/mm$^2$.

[Machinability]

The machinability was denoted as follows based on the incidence rate of tangles of chips on a product during the machining:

⊚: when the incidence rate was 10% or less;

○: when the incidence rate was 10 to 30%; and

×: when the incidence rate was more than 30%.

[Tool Abrasiveness]

The tool abrasiveness was denoted as follows:

⊚: when the Si concentration in the base metal was 1.0 mass % or less;

○: when the Si concentration in the base metal was more than 1.0 mass % but not larger than 1.5 mass %; and △: when the Si concentration in the base metal was more than 1.5 mass % but less than 4.5 mass %; and ×: when the Si concentration in the base metal was more than 4.5 mass %.

[Cracks]

It was denoted as follows:

○: when no crack created from the surface of the anodic oxide film and reached the base metal was generated; and ×: when cracks reached the base metal were generated.

[Surface Smoothness]

The surface smoothness was denoted as follows:

×: after treatment such as buffing after the anodization was required to use the product as a brake piston; and ○: no after treatment was required, and the product could be used as it was.

TABLE 1

| | Chemical composition of aluminum alloy (mass %) Balance: Al and inevitable impurities | | | | | | | | Crystals in anodic oxide film Al—Fe series crystals Al—Fe—Si series crystals | | | Percentage of occupied area of eutectic particles (%) | Evaluation | | | | |
|---|---|---|---|---|---|---|---|---|---|---|---|---|---|---|---|---|---|
| | | | | | | | | | Max. grain diameter (μm) | Average center-to-center distance (μm) | Percentage of occupied area (%) | | Base metal | | | Anodic oxide film | |
| | Si | Fe | Cu | Mn | Mg | Cr | Ti | Zn | | | | | Strength | Machinability | Tool abrasion | Cracks | Surface smoothness |
| Ex. 1 | 0.8 | 0.7 | 0.5 | 0.01 | 0.5 | 0.05 | 0.01 | 0.005 | 9.6 | 80 | 5.3 | 0 | ◎ | ◎ | ◎ | ○ | ○ |
| Ex. 2 | 0.8 | 1.5 | 0.5 | 0.01 | 0.5 | 0.05 | 0.01 | 0.005 | 10.1 | 50 | 9.1 | 0 | ◎ | ◎ | ◎ | ○ | ○ |
| Ex. 3 | 0.5 | 0.7 | 0.4 | 0.1 | 0.48 | 0.1 | 0.01 | 0.005 | 9.5 | 80 | 5.2 | 0 | ○ | ◎ | ◎ | ○ | ○ |
| Ex. 4 | 1.2 | 1.7 | 0.5 | 0.01 | 1.2 | 0.2 | 0.05 | 0.005 | 11.8 | 40 | 10.2 | 0 | ◎ | ◎ | ○ | ○ | ○ |
| Comp. Ex. 1 | 5.5 | 0.2 | 0.5 | 0.2 | 0.5 | 0.01 | 0.01 | 0.004 | | | | 6.9 | ◎ | ○ | X | ○ | X |
| Comp. Ex. 2 | 10 | 0.3 | 1 | 0.03 | 0.5 | 0.02 | 0.01 | 0.02 | | | | 9.5 | ◎ | ○ | X | ○ | X |
| Comp. Ex. 3 | 0.7 | 0.2 | 0.5 | 0.03 | 1 | 0.08 | 0.02 | 0.01 | 2 | 100 | 0.9 | 0.1 | ◎ | Δ | ○ | X | ○ |
| Comp. Ex. 4 | 1 | 0.2 | 0.05 | 0.55 | 0.88 | 0.1 | 0.02 | 0.01 | 2 | 100 | 1.2 | 0.1 | ◎ | Δ | ○ | X | ○ |
| Comp. Ex. 5 | 0.7 | 0.7 | 0.11 | 0.02 | 0.03 | 0.04 | 0.04 | 0.09 | 9.3 | 80 | 5.1 | 0 | X | ○ | ○ | ○ | ○ |
| Comp. Ex. 6 | 0.15 | 1.1 | 0.03 | 0.02 | 0.02 | 0.03 | 0.03 | 0.03 | 9.8 | 75 | 8.0 | 0 | X | ○ | ○ | ○ | ○ |

*Notes Casting cooling speed was 7° C./sec., Extrusion ratio was 22.7%, Cross-sectional area decrease rate at the drawing was 3.6%

Furthermore, as shown in Table 2, in Examples 5 and 6 and Comparative Example 7, using an aluminum alloy having the same composition as in Example 1, brake pistons were produced while changing the cooling rate of the continuous casting, the extrusion ratio, and the cross-sectional area reduction rate at the drawing, with the remaining conditions kept the same as in Example 1, and then anodized. Furthermore, in Comparative Example 8, a brake piston was produced by changing the composition of the aluminum alloy, the cooling rate of the continuous casting, the extrusion ratio, and the cross-sectional area reduction rate at the drawing, with the remaining conditions kept the same as in Example 1, and then anodized.

With respect to the anodized product in Examples 5 and 6 and Comparative Examples 7 and 8, by the same method as in Example 1, the maximum grain diameter of the Al—Fe series crystals and Al—Fe—Si series crystals in the anodic oxide film, the average center-to-center distance of the crystals and the percentage of occupied area of the crystals were investigated. Further, with the same standards as in Example 1, the generation of cracks was evaluated.

In Table 2, Examples 1 and 2 are shown again, and the production conditions, crystals in the anodic oxide film, and the evaluation of cracks of Examples 5 and 6 and Comparative Examples 7 and 8 are shown.

TABLE 2

| | Chemical composition of aluminum alloy (mass %) Balance: Al and inevitable impurities | | | | | | | | Production conditions | | | Crystals in anodic oxide film Al—Fe series crystals Al—Fe—Si series crystals | | | |
|---|---|---|---|---|---|---|---|---|---|---|---|---|---|---|---|
| | | | | | | | | | Continuous casting cooling speed (° C./sec) | Extrusion ratio (%) | Drawing cross-sectional area reduction ratio (%) | Max. grain diameter (μm) | Average center-to-center distance (μm) | Percentage of occupied area (%) | Cracks |
| | Si | Fe | Cu | Mn | Mg | Cr | Ti | Zn | | | | | | | |
| Ex. 1 | 0.8 | 0.7 | 0.5 | 0.01 | 0.5 | 0.05 | 0.01 | 0.005 | 7 | 22.7 | 3.6 | 9.6 | 80 | 5.3 | ○ |
| Ex. 2 | 0.8 | 1.5 | 0.5 | 0.01 | 0.5 | 0.05 | 0.01 | 0.005 | 7 | 22.7 | 3.6 | 10.1 | 50 | 9.1 | ○ |
| Ex. 5 | 0.8 | 0.7 | 0.5 | 0.01 | 0.5 | 0.05 | 0.01 | 0.005 | 3 | 70 | 2 | 9.8 | 70 | 5.2 | ○ |
| Ex. 6 | 0.8 | 0.7 | 0.5 | 0.01 | 0.5 | 0.05 | 0.01 | 0.005 | 15 | 10 | 15 | 9.5 | 75 | 5.2 | ○ |
| Comp. Ex. 7 | 0.8 | 0.7 | 0.5 | 0.01 | 0.5 | 0.05 | 0.01 | 0.005 | 50 | 5 | 1 | 5.0 | 40 | 5.0 | X |
| Comp. Ex. 8 | 0.8 | 1 | 0.03 | 1 | 0.5 | 0.05 | 0.01 | 0.005 | 1 | 100 | 10 | 30 | 10 | 15 | X |

Notes:
The chemical composition of the aluminum alloy in Examples 5 and 6 and Comparative Example 7 were the same as that of Example 1.

Tables 1 and 2 reveal that the brake pistons of Examples 1 to 4 were small in tool abrasion regardless of the high strength and good machinability. No cracks reached the base metal were generated in the film, and the surface smoothness was good. Also in Examples 5 and 6, no cracks reached the base metal were generated in the film.

On the other hand, in Comparative Examples 1 and 2, since a large amount of eutectic Si particles high in hardness existed, hard particles existed closely. Therefore, the tool abrasion performance and the surface smoothness were poor. In Comparative Examples 3 and 4, since the amount of crystals was small, the machinability was poor, and large cracks reached the base metal were generated. In Comparative Examples 5 and 6, since the amount of elements (Cu, Mg) which contributes to age hardening, the strength was poor. In Comparative Example 7, since the grain diameter of crystals was small and the amount of crystals remained in the film was reduced, large cracks reached the base metal were generated. In Comparative Example 8, the maximum grain diameter of crystals was large and the distance between grains/particles was small, and therefore large cracks reached the base metal were generated.

This application claims priority to Japanese Patent Application No. 2009-290876 filed on Dec. 22, 2009, and the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

INDUSTRIAL APPLICABILITY

The aluminum alloy of the present invention can be utilized in producing a sliding component required to have strength and abrasion resistance.

DESCRIPTION OF THE REFERENCE NUMERALS

1 brake piston
20 anodic oxide film
21 particles/grains of Al—Fe series crystals and Al—Fe—Si series crystals

The invention claimed is:

1. An aluminum alloy component in which an anodic oxide film is formed on a surface of a base metal of an aluminum alloy,
   wherein the aluminum alloy consists of Fe: 0.5 to 2 mass %, Cu: 0.35 to 0.6 mass %, Mg: 0.35 to 1.3 mass %, Si: 0.2 to 1.3 mass %, Cr: 0.05 to 0.3 mass %, Mn: 0.01 to 0.3 mass %, Ti: 0.005 to 0.1 mass %, and a balance being Al and inevitable impurities, wherein Zn is controlled to be less than 0.25 mass %, and
   wherein Al—Fe crystals and Al—Fe—Si crystals having a maximum grain diameter of 30 μm or less exist in the anodic oxide film in a dispersed manner with an average center-to-center distance of 10 to 100 μm, and a percentage of a total occupied area of the Al—Fe crystals and Al—Fe—Si crystals in the anodic oxide film is 5.2% or more.

2. The aluminum alloy component as recited in claim 1, wherein the aluminum alloy component is a brake piston.

* * * * *